(12) United States Patent
Ellis et al.

(10) Patent No.: US 7,756,963 B2
(45) Date of Patent: Jul. 13, 2010

(54) AUTOMATED TOOL MANAGEMENT IN A MULTI-PROTOCOL ENVIRONMENT

(75) Inventors: Raymond Walter Ellis, Austin, TX (US); Mark Theodore Pendleton, San Diego, CA (US); Charles Merritt Baylis, Cincinnati, OH (US)

(73) Assignee: PEER Intellectual Property, Inc., Kitchener, Ontario (CA)

( * ) Notice: Subject to any disclaimer, the term of this patent is extended or adjusted under 35 U.S.C. 154(b) by 103 days.

(21) Appl. No.: 11/871,118

(22) Filed: Oct. 11, 2007

(65) Prior Publication Data

US 2008/0034376 A1     Feb. 7, 2008

Related U.S. Application Data

(63) Continuation of application No. 09/899,833, filed on Jul. 5, 2001, now Pat. No. 7,403,984.

(51) Int. Cl.
*G06F 15/16* (2006.01)
(52) U.S. Cl. ............... 709/223; 709/224; 709/204; 709/217; 709/203; 709/227; 709/228; 370/230; 370/466; 710/105
(58) Field of Classification Search ............ 709/229, 709/203, 224, 228
See application file for complete search history.

(56) References Cited

U.S. PATENT DOCUMENTS 4,698,766 A     10/1987    Entwistle et al.

(Continued)

FOREIGN PATENT DOCUMENTS

EP     0620631     3/1994

(Continued)

OTHER PUBLICATIONS

Shaopeng Wang et al: "Enabling robustness and flexibility of equipment data collection through Semi EDA standards" Advanced Semiconductor Manufacturing, 2004 ASMC '04. IEEE Covnerence and Workshop Boston, MA, USA May 4-6, 2004, Piscataway, NJ, USA, IEEEE, US, May 4, 2004, pp. 165-169, XP010768986, ISBN: 0-780-8312-5; figures 1, 5; Sections "Common Equipment Model" and "Integration" .

(Continued)

*Primary Examiner*—Jude J Jean Gilles
(74) *Attorney, Agent, or Firm*—Martine Penilla & Gencarlle, LLP

(57) ABSTRACT

A system, computer program product and method for automated tool management in a multi-protocol environment. A user may issue a message in accordance with an object-oriented interapplication communication protocol to a corresponding application interface unit. The message may be a request to perform a particular action on a selected tool. The content of the message may be extracted by the corresponding application interface unit which may comprise data required by the requested action and a pointer to the object representing the tool. The application interface unit may invoke a method of the object pointed to by the pointers in the message. A value may then be procured by an equipment model where the value may be associated with particular information requested in the message about a tool or a notification informing the user that an event occurred. The equipment model may transfer the value to the appropriate user.

11 Claims, 13 Drawing Sheets

U.S. PATENT DOCUMENTS

| | | | |
|---|---|---|---|
| 5,271,453 | A | 12/1993 | Yoshida et al. |
| 5,291,416 | A | 3/1994 | Hutchins |
| 5,432,702 | A | 7/1995 | Barnett |
| 5,453,933 | A | 9/1995 | Wright et al. |
| 5,592,600 | A | 1/1997 | De Pauw et al. |
| 5,805,442 | A | 9/1998 | Crater et al. |
| 5,809,028 | A | 9/1998 | Nethercott et al. |
| 5,826,040 | A | 10/1998 | Fargher et al. |
| 5,847,957 | A | 12/1998 | Cohen et al. |
| 5,948,063 | A | 9/1999 | Cooper et al. |
| 5,961,588 | A | 10/1999 | Cooper et al. |
| 5,987,135 | A | 11/1999 | Johnson et al. |
| 6,016,516 | A | 1/2000 | Horikiri |
| 6,021,331 | A | 2/2000 | Cooper et al. |
| 6,094,678 | A | 7/2000 | Nethercott et al. |
| 6,167,451 | A | 12/2000 | Stracke, Jr. |
| 6,198,480 | B1 | 3/2001 | Cotugno et al. |
| 6,201,996 | B1 | 3/2001 | Crater et al. |
| 6,332,163 | B1 | 12/2001 | Bowman-Amuah |
| 6,349,341 | B1 | 2/2002 | Likes |
| 6,370,448 | B1 | 4/2002 | Eryurek |
| 6,418,214 | B1 | 7/2002 | Smythe et al. |
| 6,418,352 | B1 | 7/2002 | Ellis et al. |
| 6,421,682 | B1 | 7/2002 | Craig et al. |
| 6,463,352 | B1 | 10/2002 | Tadokoro et al. |
| 6,470,227 | B1 | 10/2002 | Rangachari et al. |
| 6,535,779 | B1 | 3/2003 | Birang et al. |
| 6,549,199 | B1 | 4/2003 | Carter et al. |
| 6,549,937 | B1 | 4/2003 | Auerbach et al. |
| 6,553,403 | B1 | 4/2003 | Jarriel et al. |
| 6,615,091 | B1 | 9/2003 | Birchenough et al. |
| 6,618,425 | B1 | 9/2003 | Carlesi et al. |
| 6,640,151 | B1 | 10/2003 | Somekh et al. |
| 6,658,571 | B1 | 12/2003 | O'Brien et al. |
| 6,681,145 | B1 | 1/2004 | Greenwood et al. |
| 6,708,223 | B1 | 3/2004 | Wang et al. |
| 6,826,439 | B1 | 11/2004 | Barber et al. |
| 6,832,120 | B1 | 12/2004 | Frank et al. |
| 6,842,660 | B2 | 1/2005 | Tripathi et al. |
| 6,944,584 | B1 | 9/2005 | Tenney et al. |
| 7,031,783 | B2 | 4/2006 | O'Grady et al. |
| 7,053,767 | B2 | 5/2006 | Petite et al. |
| 7,069,101 | B1 | 6/2006 | Arackaparambil et al. |
| 2002/0026514 | A1 | 2/2002 | Ellis et al. |
| 2002/0049679 | A1* | 4/2002 | Russell et al. ............ 705/52 |
| 2003/0069848 | A1* | 4/2003 | Larson et al. ............ 705/50 |
| 2003/0134590 | A1 | 7/2003 | Suda et al. |

FOREIGN PATENT DOCUMENTS

| | | |
|---|---|---|
| EP | 0612004 A1 | 8/1994 |
| EP | 0747795 | 6/1996 |
| EP | 0822473 A2 | 2/1998 |
| WO | 9534866 | 12/1995 |
| WO | 0157823 A2 | 8/2001 |

OTHER PUBLICATIONS

Semi E-37-0298; High-Speed SECS Message Services (HSMS) Generic Services (1998), pp. 1-24.

Semi E4-0699; Semi Equipment Communications Standard 1 Message Transfer (SECS-I) (1999), pp. 1-20.

Semi E30-0299; Generic Model for Communications and Control of Semi Equipment (GEM) (1992), pp. 1-76.

Semi E5-0699; Semi Equipment Communication Standard 2 Message Content (SECS-II) (1999), pp. 1-240.

Office Action dated Aug. 24, 2005, U.S. Appl. No. 09/899,833, filed Jul. 5, 2001.

Office Action dated Apr. 15, 2004, U.S. Appl. No. 09/496,009, filed Feb. 1, 2000.

Office Action dated Jan. 4, 2005, U.S. Appl. No. 09/496,009, filed Feb. 1, 2000.

Office Action dated Aug. 8, 2005, U.S. Appl. No. 09/496,009, filed Feb. 1, 2000.

Final Office Action dated Feb. 17, 2006, U.S. Appl. No. 09/496,009, filed Feb. 1, 2000.

Advisory Action dated May 9, 2006, U.S. Appl. No. 09/496,009, filed Feb. 1, 2000.

Office Action dated Sep. 1, 2006, U.S. Appl. No. 09/496,009, filed Feb. 1, 2000.

Office Action dated May 4, 2007, U.S. Appl. No. 09/496,009, filed Feb. 1, 2000.

Response to Office Action dated Aug. 28, 2007, U.S. Appl. No. 09/496,009, filed Feb. 1, 2000.

Office Action dated Nov. 29, 2004, U.S. Appl. No. 09/899,833, filed Jul. 5, 2001.

Response to Final Office Action dated Mar. 29, 2007, U.S. Appl. No. 09/899,833, filed Jul. 5, 2001.

Office Action dated Jun. 6, 2006, U.S. Appl. No. 09/899,833, filed Jul. 5, 2001.

Final Office Action dated Feb. 27, 2007, U.S. Appl. No. 09/899,833, filed Jul. 5, 2001.

* cited by examiner

Fig. 6

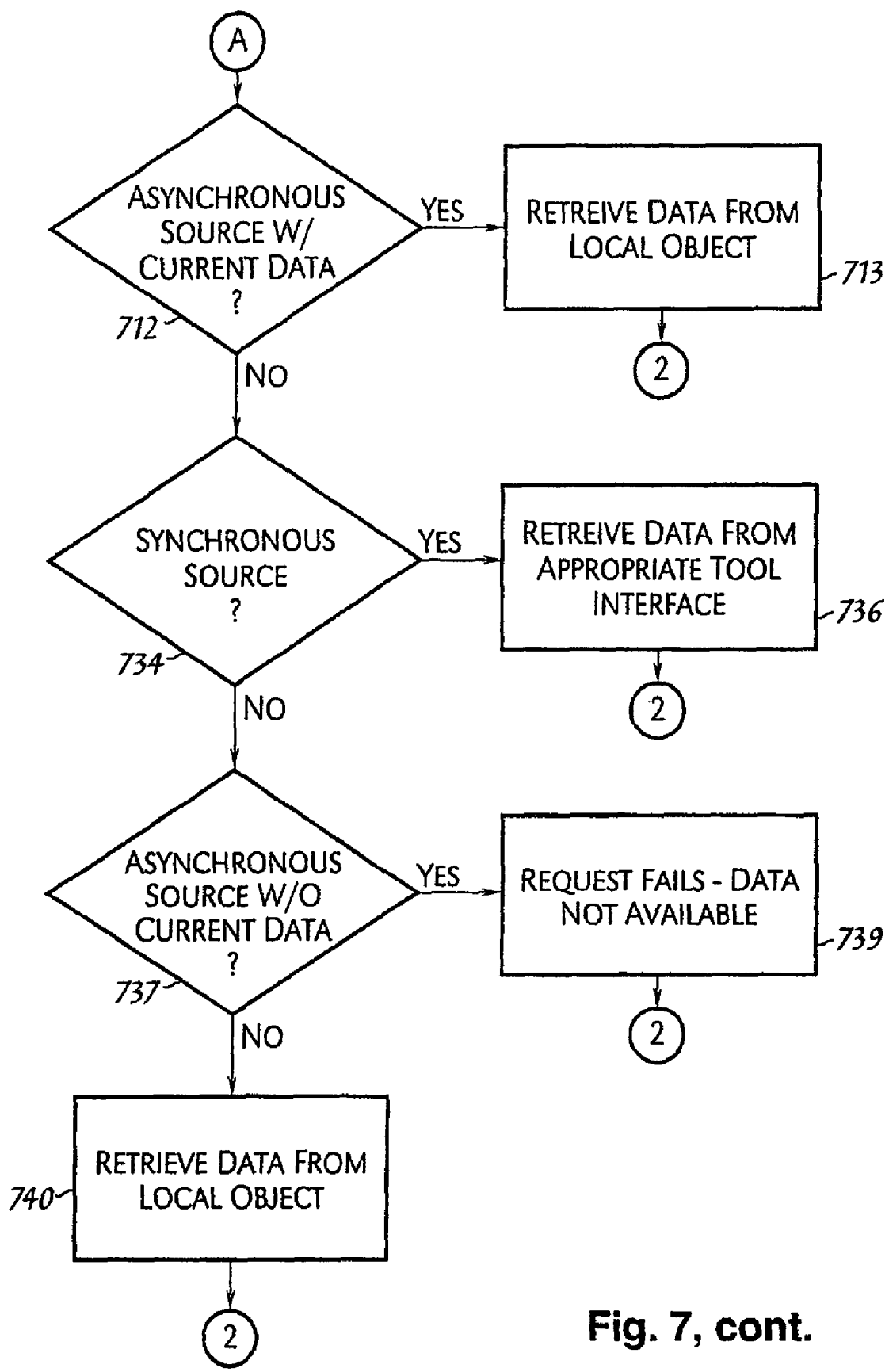
Fig. 7, cont.

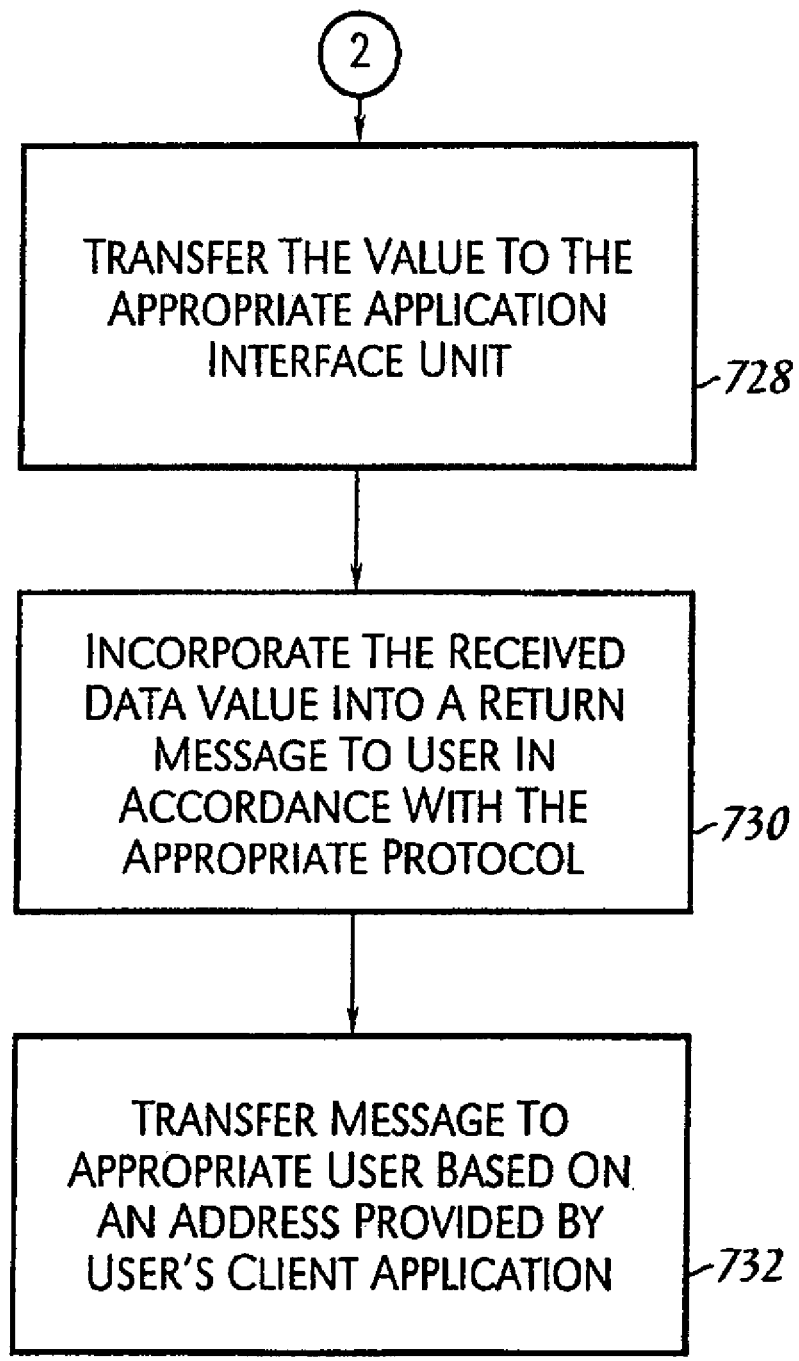
Fig. 7, cont.

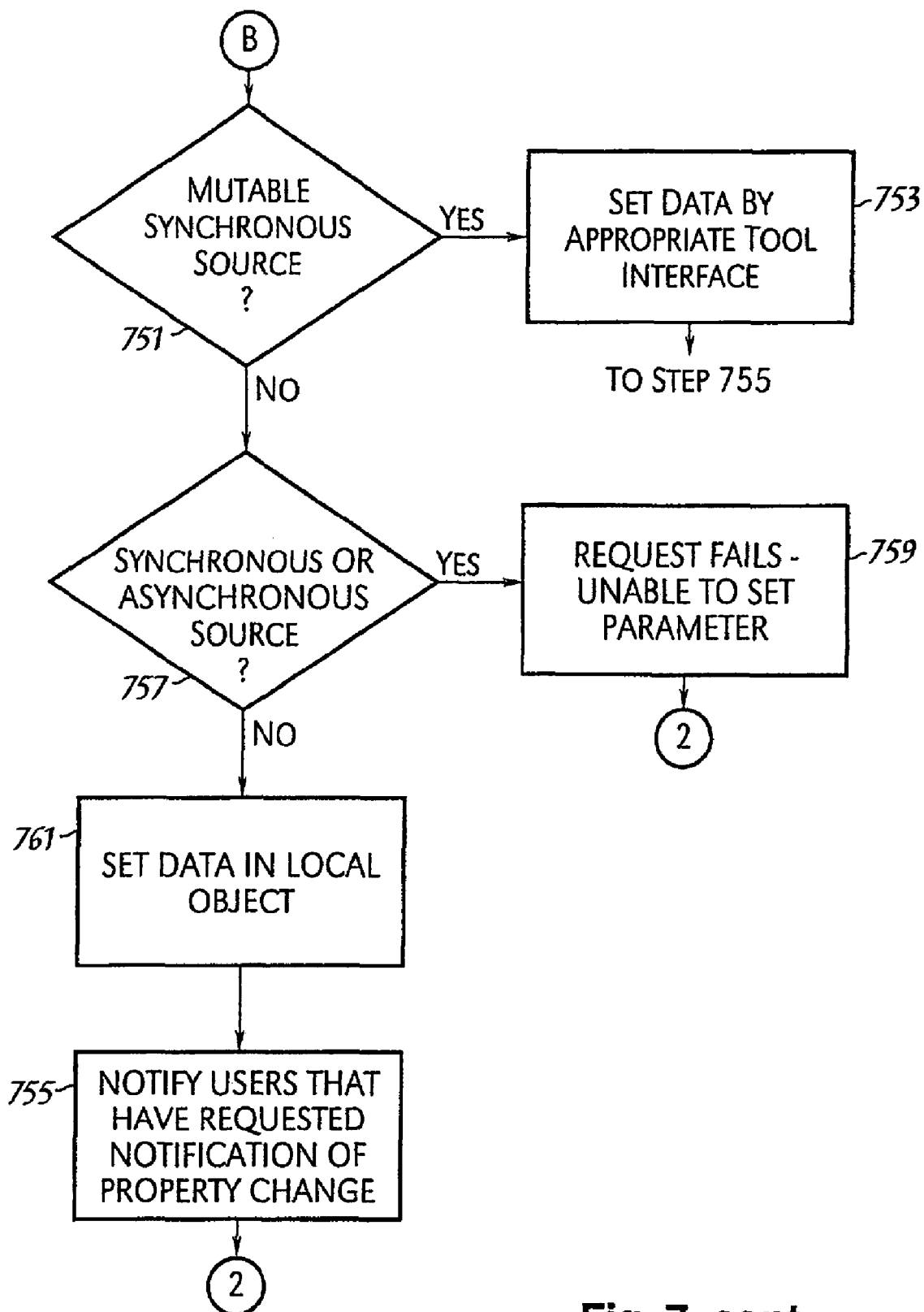
Fig. 7, cont.

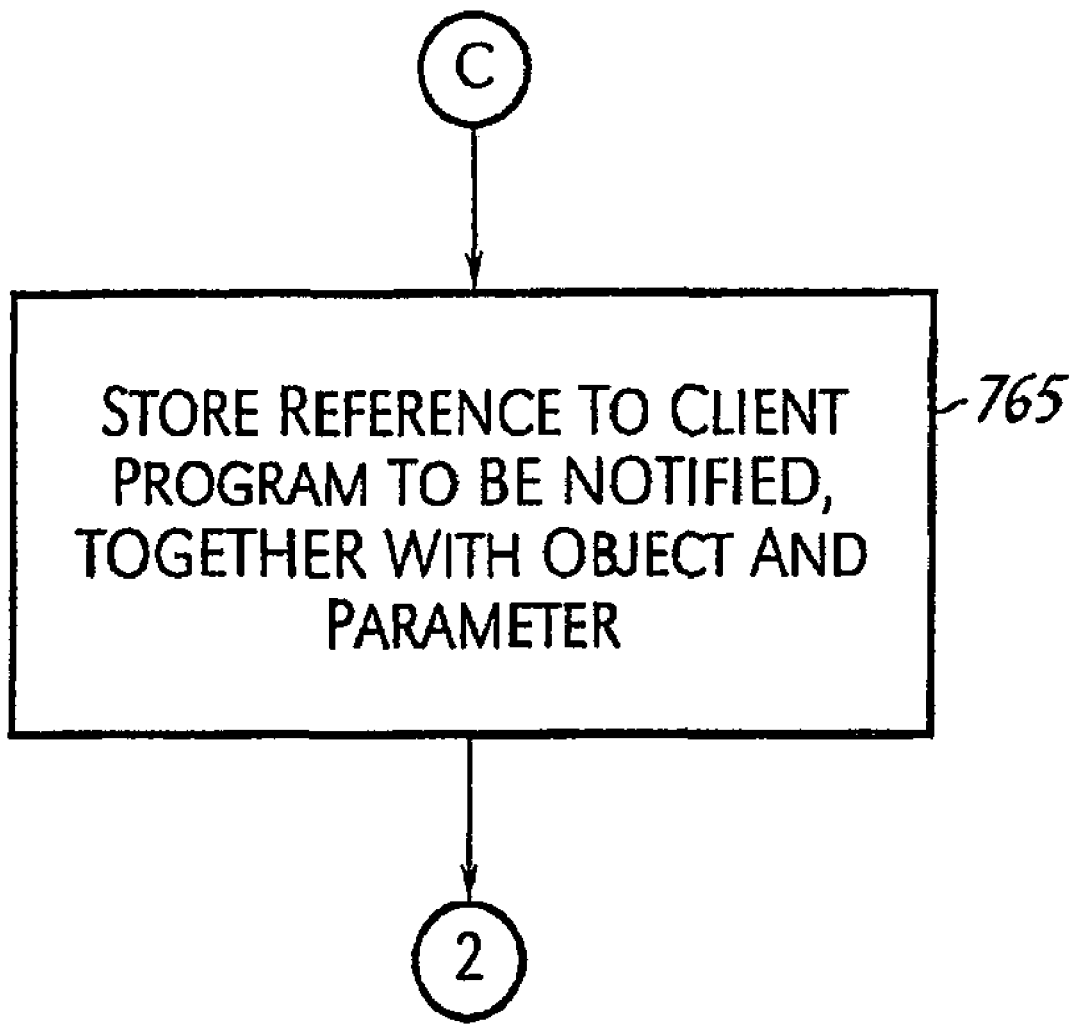
Fig. 7, cont.

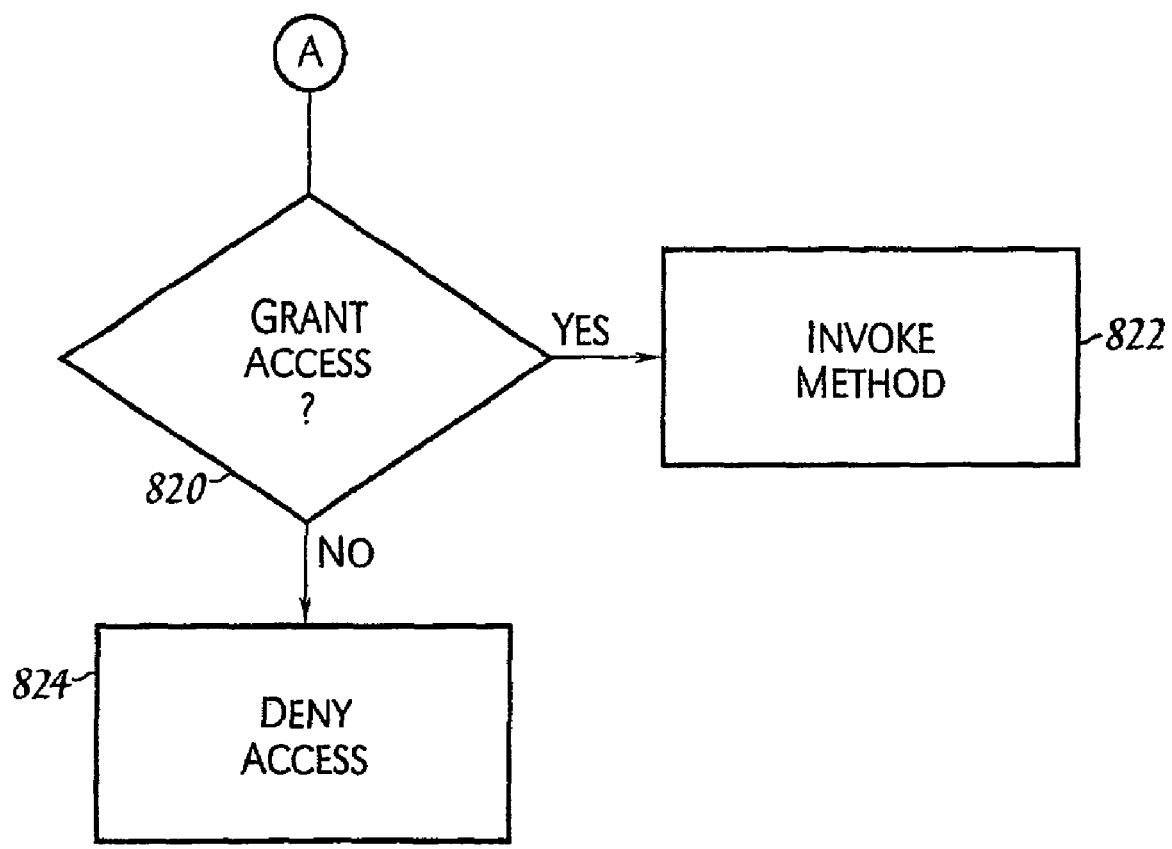
Fig. 8, cont.

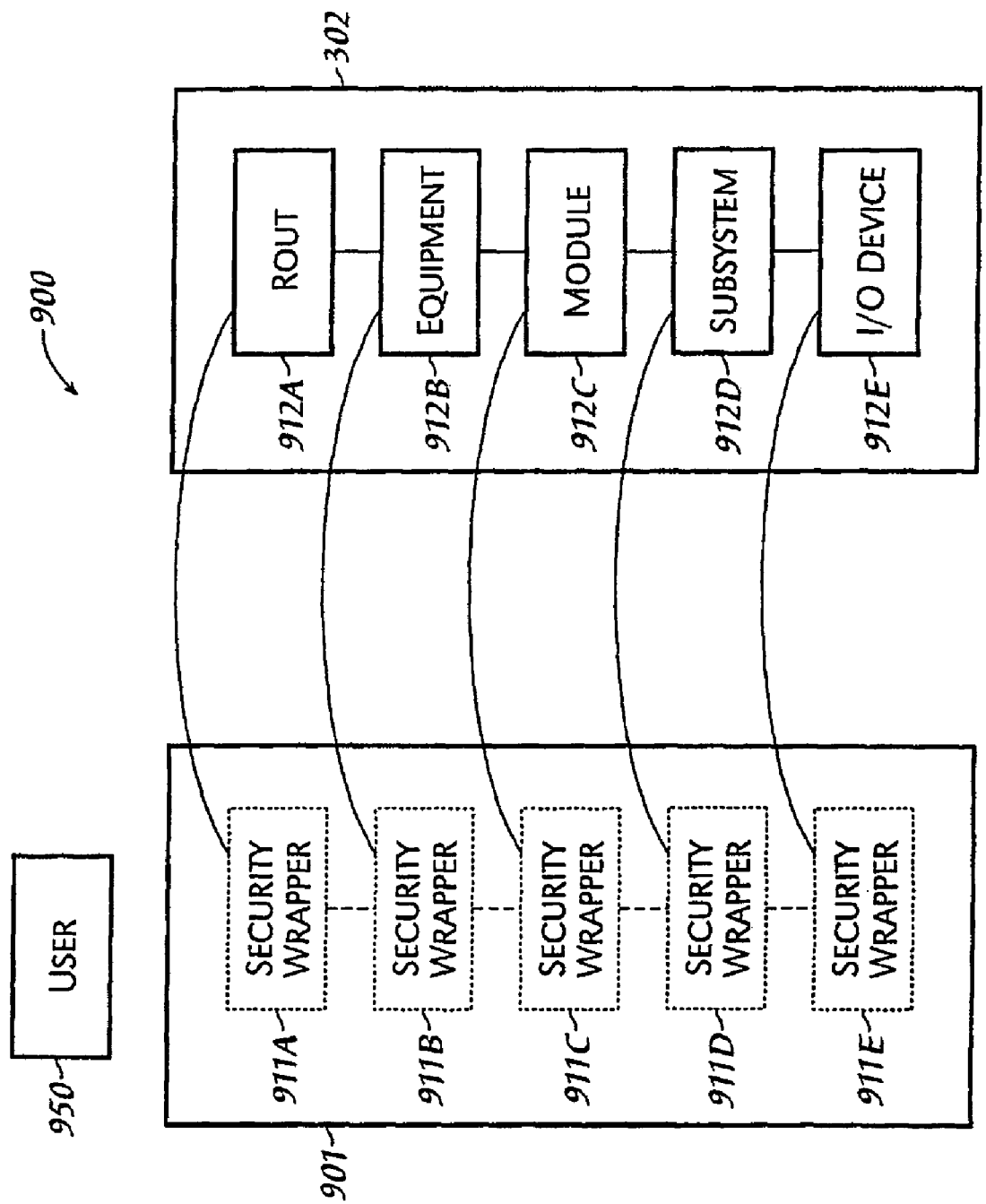

AUTOMATED TOOL MANAGEMENT IN A MULTI-PROTOCOL ENVIRONMENT

CROSS REFERENCE TO RELATED APPLICATIONS

This application is related to the following commonly owned U.S. Patent Applications:

Provisional Application Ser. No. 60/216,819, filed Jul. 7, 2000, and claims the benefit of its earlier filing date under 35 U.S.C. 119(e); and Application Ser. No. 09/496,009, "Apparatus and Method for Web-based Tool Management", filed Feb. 1, 2000, of which this application is a continuation-in-part.

TECHNICAL FIELD

The present invention relates to manufacturing processing, and more particularly to providing a mechanism to control manufacturing equipment in a multi-protocol environment.

BACKGROUND INFORMATION

Modern manufacturing facilities rely on highly automated tools to implement the manufacturing process. For example, semiconductor fabrication ("fab") facilities incorporate highly automated tool sets for the processing of semiconductor wafers. Process control and monitoring is mediated through a set of software methods which may be invoked to implement the processes and monitoring to be performed. The control and monitoring software run on a tool server which may be coupled to the tools via a plurality of ports, each of which interfaces the tool server with a particular tool, in point-to-point fashion. Alternatively, the tools in the tool server may reside on a Local Area Network (LAN). To control the manufacturing process, a user must be able to communicate with the tool server, either via a user system resident on the LAN, or otherwise in communication with the tool server. In particular, remote access to the tool server for control and monitoring of the status of a tool, to the extent that it exists at all, requires the development of specialized code implemented on each platform for which remote access is to be provided. However, modem data processing systems typically offer a multiplicity of preexisting software applications such as browsers and spreadsheet software which include facilities for object-oriented interapplication or interprocess communication. These facilities interprocess communication across different platforms and software environments. Thus, there is a need in the art for systems and methods for adapting interfacing application software which may use a multiplicity of object-oriented interprocess communication protocols to the manufacturing equipment. Additionally, such interfacing system and methods should accommodate legacy tool control and monitoring applications as well as enforcing security policies.

SUMMARY

The problems outlined above may at least in part be solved in some embodiments by facilitating interprocess communication across different platforms and software environments using a multiplicity of object-oriented interprocess communication protocols to the manufacturing equipment.

In one embodiment, a process for automating tool management may comprise the step of a user using an application may issue a message in accordance with an object-oriented interapplication communication protocol, or (equivalently object-to-object protocol) e.g., Component Object Model (COM), Java™ Remote Method Invocation (RMI), Common Object Request Broker Architecture (CORBA), Simple Object Access Protocol (SOAP), or network transfer protocol, such as the Hypertext Transfer Protocol (HTTP), in a variety of manners, e.g., Wide Area Network (WAN), Local Area Network (LAN). The message may be a request to perform a particular action, e.g., extract particular information from a tool, setting a variable or parameter associated with an object of a tool to a particular value. An object associated with a tool may define the state of a tool.

The message may be received by a corresponding application interface unit. An application interface unit may be configured to interface between an equipment model, e.g., OBEM, and the user. The application interface unit may further be configured to extract the content of the received message which may comprise data required by the requested action. Included in the message may be a pointer to the object in the equipment model representing the tool on which the action is to be performed. The application interface unit may invoke a method of the object pointed to by the pointers in the message and pass the data constituting the message content to the method. The method may then provide remote object access which may allow for remote diagnostics and repair.

A value may then be procured by the equipment model where the value is associated with the requested action and data in the message. That is, the value may be associated with particular information requested in the message about a tool, e.g., temperature, pressure, status, or a notification informing the user that an event, e.g., alarm goes off, occurred. The equipment model may transfer the value to the appropriate user based on an address provided by the user's application.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 6 illustrates a portion of another exemplary GUI configured in accordance with the present invention;

FIG. 9 illustrates an embodiment of the present invention of a security wrapper architecture.

DETAILED DESCRIPTION

Figure 1:
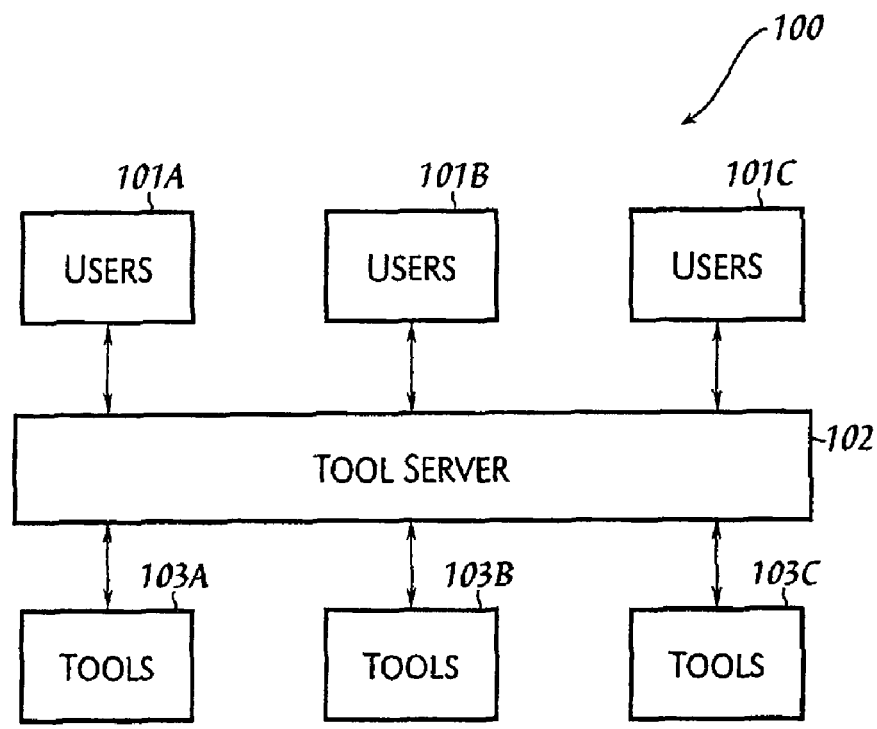
FIG. 1 illustrates an embodiment of a system configured in accordance with the present invention.

In the following description, numerous specific details are set forth to provide a thorough understanding of the present invention. For example, particular message formats and interapplication communication protocols may be referred to, however, it would be recognized by those of ordinary skill in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

FIG. 1 illustrates an embodiment of the present invention of a system 100 configured to provide a mechanism for allowing one or more users 101A-C to communicate with one or more tools 103A-C via a tool server 102. Users 101A-C may collectively or individually be referred to as users 101 or user 101, respectively. Tools 103A-C may collectively or individually be referred to as tools 103 or tool 103, respectively. It is noted that system 100 may include any number of users 101 and tools 103 and that FIG. 1 is illustrative. It is further noted that the connection between users 101 and tool server 102 and the connection between tool server 102 and tools 103 may be any medium type, e.g., wireless, wired. It is further noted that user 101 may be a user of any type of device, e.g., wireless, Personal Digital Assistant (PDA), cell phone, personal computer system, workstation, Internet appliance, configured with the capability of connecting to tool server 102 and consequently communicating with tools 103.

Tool server 102 may be configured to extract particular information, e.g., temperature, from tools 103. Information may be obtained by sending, via the tool server, a request message to a tool, and the information returned by the tool, via the tool server, in a reply message. Additionally, a tool may send notification messages, via the tool server, to the user. Notification messages may, for example, alert the user that a preselected condition in the tool has occurred. Message content may be formatted in accordance with a particular communication protocol. For example, in semiconductor fabrication tools, such communication protocol may be the SEMI Communication Standard (SECS), particularly SECS-II. (SECS is promulgated by the SEMI Equipment standards promulgated by Semiconductor Equipment and Materials International (SEMI)). (Those of ordinary skill would appreciate that the present invention is not limited to the semiconductor fabrication industry, and the principles of the present invention may be applied to tool automation systems in other areas of manufacturing, for example the automobile industry, and such embodiments would fall within the spirit and scope of the present invention.) In accordance with the principles of the present invention, described further below, users 101 may be able to control tools 103 and extract particular information from tools 103 by issuing a message from a multiplicity of applications, for example, spreadsheets, browsers, or tool control legacy applications using an object-oriented interapplication communication protocol, e.g., Component Object Model (COM), Java™ Remote Method Invocation (RMI), Common Object Request Broker Architecture (CORBA), Simple Object Access Protocol (SOAP), or network transfer protocol, such as the Hypertext Transfer Protocol (HTTP), to tool server 102. (Note that, as would be understood by those of ordinary skill in the art, such protocols may be layered in that, for example, SOAP defines an interapplication messaging protocol for wrapping the message in an XML document that is transferred in accordance with the HTTP.) The message may be a request to extract particular information, for example, temperature, status, pressure, or request a service, for example, start/stop a tool operation, from one or more tools 103, e.g., equipment used in semiconductor fabrication facilities. For example, a user 101 may issue a message requesting the temperature in a particular chamber where the particular chamber represents a tool 103 in the manufacturing process, e.g., semiconductor process. A more detailed discussion of users 101 procuring information on tools 103 via tool server 102 is provided in FIG. 5. A detailed discussion of tool server 102 is provided below.

Figure 2:
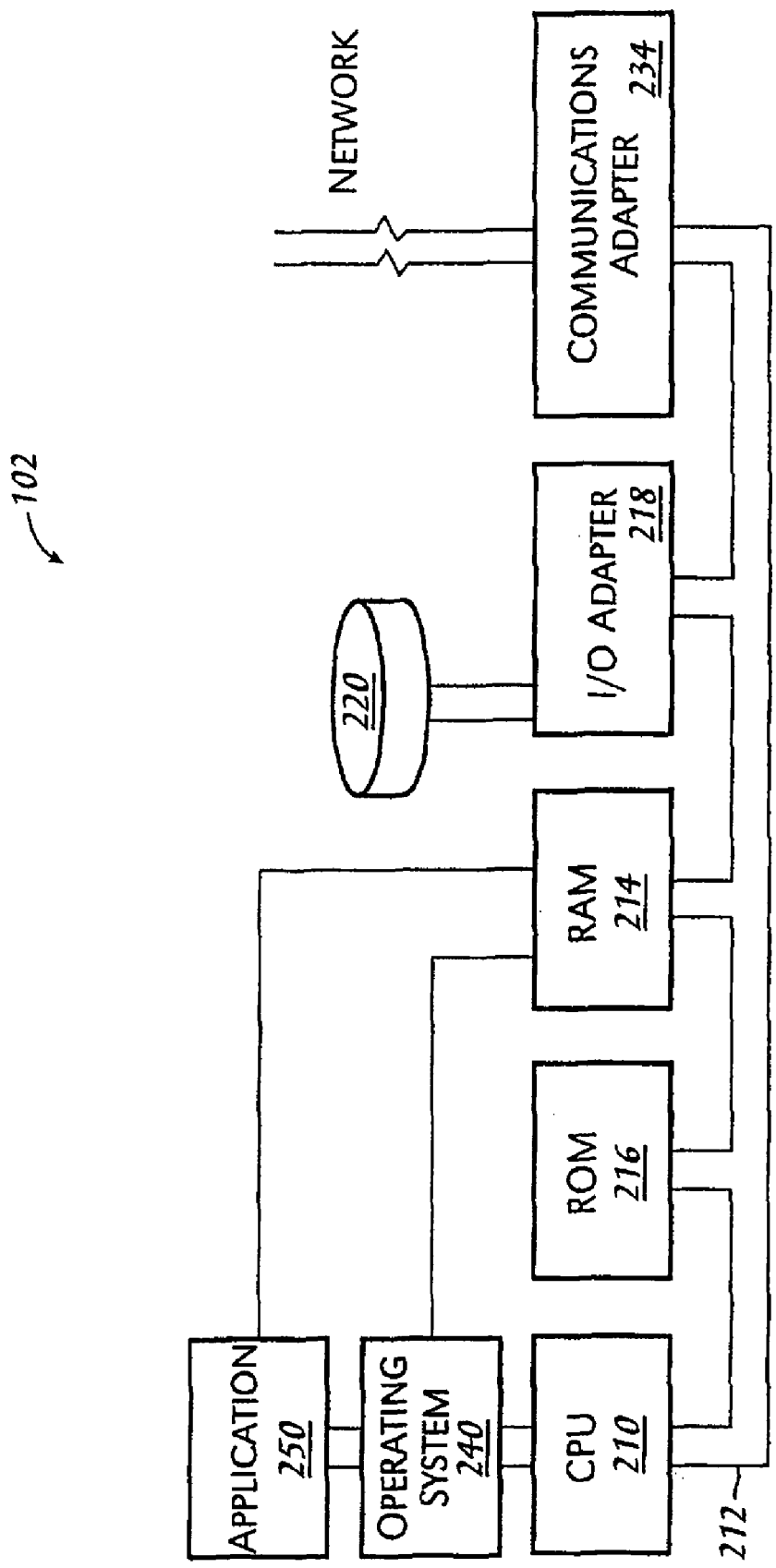
FIG. 2 illustrates an embodiment of the present invention of a tool server.

Refer now to FIG. 2 which illustrates an embodiment of the present invention of tool server 102. Referring to FIG. 2, tool server 102 may comprise a central processing unit (CPU) 210 coupled to various other components by system bus 212. An operating system 240 runs on CPU 210 and provides control and coordinates the function of the various components of FIG. 2. Application 250, e.g., program for communicating control and data manages with one or more tools 103 as described in FIG. 5, program for providing security in users 101 accessing tool server 102 as described in FIG. 7, runs in conjunction with operating system 240 which implements the various functions to be performed by application 250. Read only memory (ROM) 216 is coupled to system bus 212 and includes a basic input/output system ("BIOS") that controls certain basic functions of tool server 102. Random access memory (RAM) 214, disk adapter 218 and communications adapter 234 are also coupled to system bus 212. It should be noted that software components including operating system 240 and application 250 are loaded into RAM 214 which is the computer system's main memory. Disk adapter 218 may be a small computer system interface ("SCSI") adapter that communicates with disk units 220, e.g., disk drive. It is noted that the program of the present invention that retrieves information from one or more tools 103, as described FIG. 5, may be stored in disk unit 220 and retrieved therefrom and loaded into RAM by the operating system when initiated or otherwise required. It is further noted that the program of the present invention that provides security for users 101 accessing tool server 102, as described FIG. 7, may be stored in disk unit 220 and retrieved therefrom and loaded into RAM by the operating system when initiated or otherwise required.

Communications adapter 234 interconnects bus 212 with an outside network enabling tool server 102 to communicate with other such systems via a Local Area Network (LAN), e.g., Ethernet, Token Ring, ARCnet, or a Wide Area Network (WAN), e.g., Internet.

Implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by tool server 102, the set of instructions may be stored as a computer program product in another device, for example, in disk drive 220 (which may include a removable memory such as an optical disk or floppy disk for eventual use in disk drive 220). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
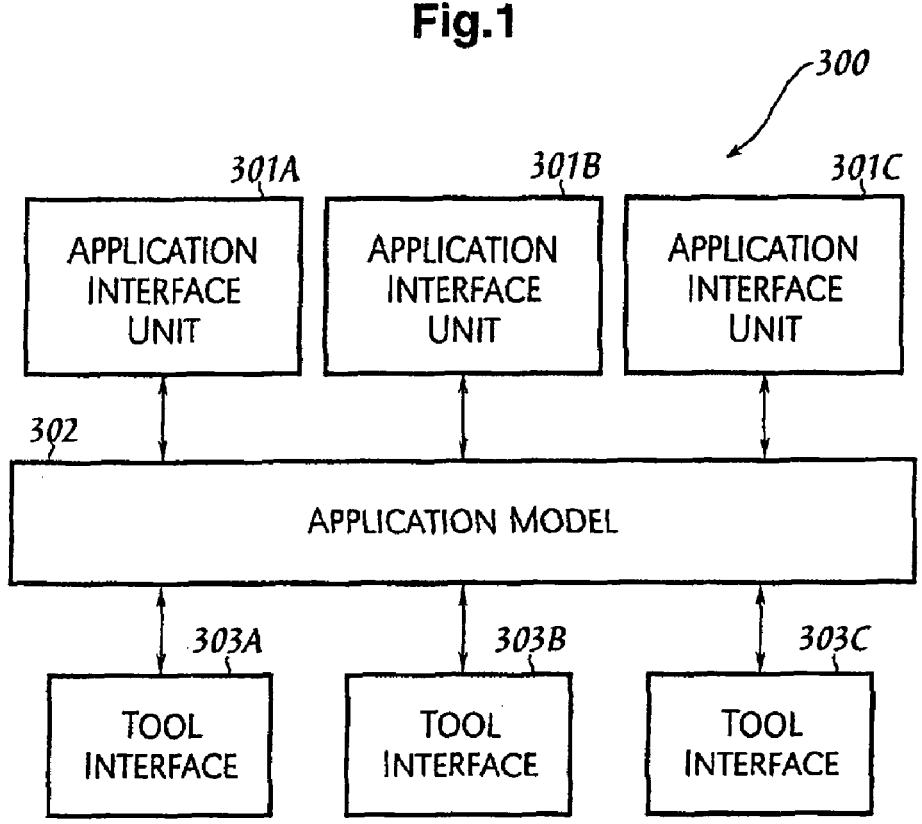
FIG. 3 illustrates an embodiment of a software architecture of the program of the present invention configured to provide automated tool management in a multi-protocol environment.
Figure 5:
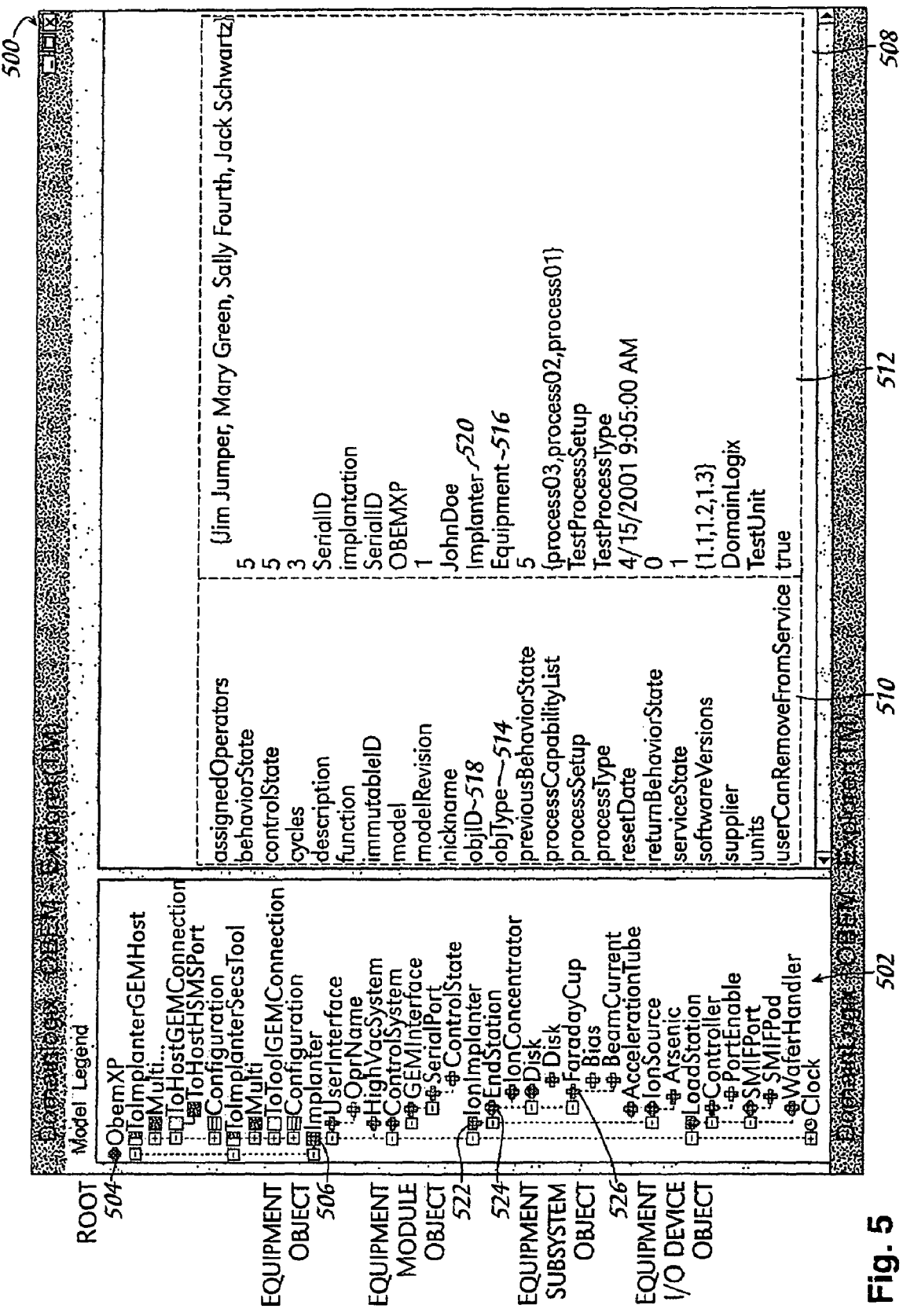
FIG. 5 illustrates a Graphical User Interface (GUI) depiction of an exemplary equipment model configured in accordance with the present invention.

FIG. 3 illustrates an embodiment of the present invention of the software architecture 300 of the program of the present invention configured to retrieve information from one or more tools 103 as described in FIG. 5. Software architecture 300 may comprise one or more application interface units 301A-C, an equipment model 302, and one or more tool interface units 303A-C. Application interface units 301A-C may collectively or individually be referred to as application interface units 301 or application interface unit 301, respectively. Tool interface units 303A-C may collectively or individually be referred to as tool interface units 303 or tool interface unit 303, respectively. It is noted that software architecture 300 may comprise any number of application interface units 301 and tool interface units 303 and that FIG. 3 is illustrative.

Application interface units 301 may be configured to interface application model 302 to users 101. Equipment model 302 may be configured to provide a logical representation of tools 103 thereby allowing users 101 to communicate with tools 103. That is, equipment model 302 may provide a logical mapping of tools 103 the physical equipment with which the tools are composed. A tool supplier may decompose the equipment into the objects of the equipment model to map the physical equipment into the characteristics of the objects of the equipment model, such as equipment model 302. One such equipment model is the Object-Based Equipment Model (OBEM) promulgated by SEMI as SEMI Provisional Specification SEMI E98-1000, hereby incorporated herein by reference. Note that other equipment models may be used in conjunction with the present invention, and such embodiments would be understood by those of ordinary skill to fall within the spirit and scope of the present invention. A description of a model schema which may be used to instantiate equipment model 302 is provided in FIG. 4. An exemplary equipment model will be described in conjunction with FIG. 5.

Figure 4:
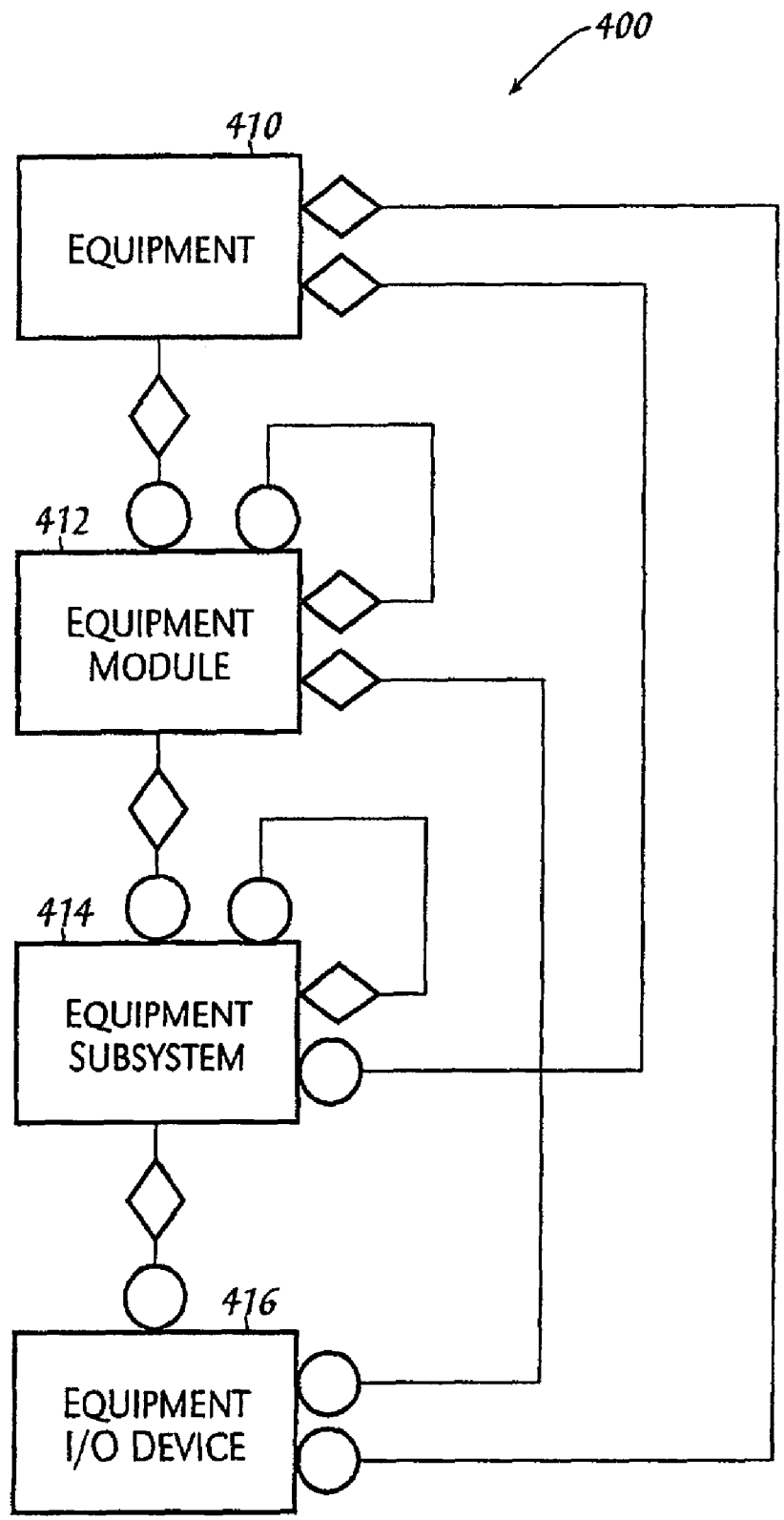
FIG. 4 illustrates a Unified Modeling Language (UML) diagram of an equipment model configured in accordance with the present invention.

FIG. 4 illustrates a Unified Modeling Language (UML) diagram of an equipment model schema 402 which may be used with the present invention. Equipment object model schema 402 may be an object-oriented model which includes a plurality of objects. In accordance with object-oriented software architectures, objects may be composed of subobjects, which may inherit attributes and methods of the superobjects. Equipment model schema 402 includes an aggregation hierarchy 404, and an interface inheritance hierarchy 406. Objects in aggregation hierarchy 404 may be concrete objects while objects of inheritance hierarchy 406 may be abstract object which define the attributes and methods of the concrete objects. (In an implementation of the present invention in the Java™ programming language, abstract objects types in inheritance hierarchy 406 may be interfaces.)

Aggregation hierarchy 404 includes user object 408. Equipment object 410 may contain (denoted by open diamond) zero or more equipment module objects 412 (denoted by circle). Additionally, equipment object 410 may contain zero or more equipment subsystem objects 414, and equipment I/O device objects 416. Equipment module object 412 itself may contain zero or more equipment module objects 412, equipment subsystem objects 414 and equipment I/O devices 416. Similarly, equipment subsystem object 414 may contain zero or more equipment subsystem objects 414 and zero or more equipment I/O objects 416. Aggregation hierarchy 406 may represent a decreasing complexity of object type from the top to bottom of the hierarchy.

Refer now to FIG. 5 illustrating a graphical user interface (GUI) depiction 500 of an exemplary equipment model 502 in accordance with the schema of FIG. 4. Model 502 is illustrative of an equipment model which may be used with the present invention, and an artisan of ordinary skill in the art would appreciate that a model of an tool may have other numbers and types of objects corresponding to an embodiment of a manufacturing facility.

Model 502 is presented in hierarchical form, in GUI 500, and includes a root node 504. Equipment object 506 is, in exemplary model 502, an implanter. Pane 508 of GUI 500 illustrates a set of attributes 510 and corresponding values 512 associated with equipment object 504. Note that one attribute in set 508 is objType (514) which has the value "Equipment" (516). Another attribute is objID (518) which has the value "implanter" (520). Pane 508 illustrating attribute set 510 and values 512 may be displayed in GUI 500 by selecting equipment object 506 (as shown by the "highlighting" of the object identifier "implanter" in model 502.) The selection of objects in a GUI, for example by "mouse-clicking," is known to artisans of ordinary skill in the art.

Equipment module object 522 is, in model 502 an ion implanter, and is a child object of equipment object 506. An attribute list and associated values corresponding to attributes of equipment module object (not shown in FIG. 5) may be displayed by selecting equipment module object 522 in the same fashion as discussed above in conjunction with equipment object 506.

Other objects in model 502 include subsystem object 524 and equipment I/O object 526. Subsystem object 524, an endstation, is a child object of the ion implanter, equipment module object 522, and I/O object 526, a Faraday cup, is a child object of subsystem object 524.

In accordance with object-oriented software principles, the objects of an equipment model, such as model 502, are instances of classes which include data and methods that operate on the data. (The set of attributes discussed hereinabove are examples of such data.) Thus, an object is a data structure that includes data and code for operating on the data. In particular, objects of an equipment model, which, recall, is a logical representation of a manufacturing facility, include methods for returning child objects of a particular object. In other words, a user accessing an equipment model can explore the model, by for example "drilling down" through the hierarchy of model 502, in similar fashion to drilling down through a hierarchy of directories and files, familiar to those of ordinary skill in the data processing art. In this way, the user's client application acquires pointers to objects of the model. These may then be used by the user's client application to send messages to the tool, or component thereof, for requesting data or services from the tool through the intermediation of the object corresponding to the logical representation of the tool, or component of the tool. Such messaging will be discussed hereinbelow in conjunction with FIG. 7.

Figure 6:
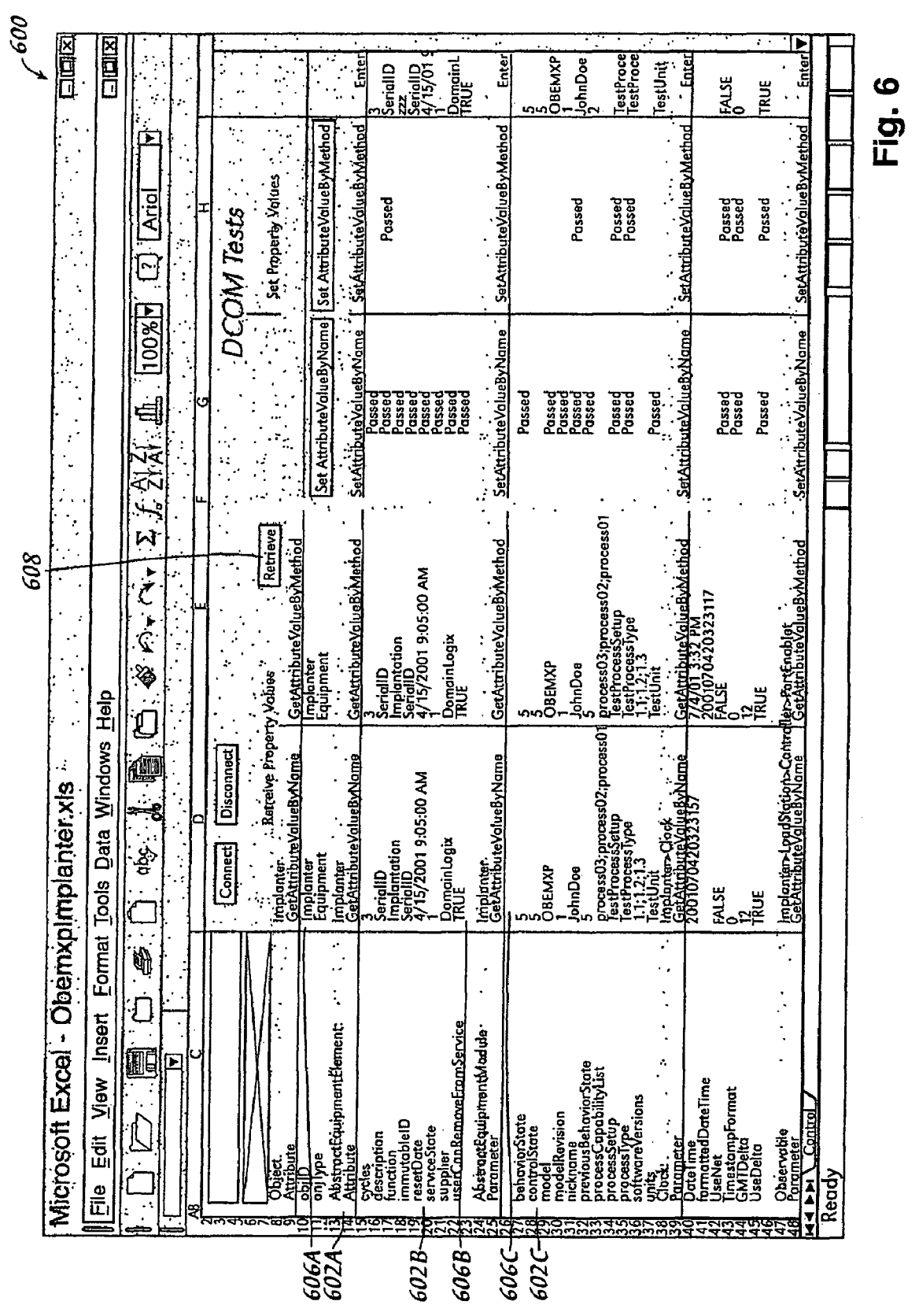

FIG. 6 illustrates a portion of another exemplary GUI 600 which may be used in an embodiment of the present invention. GUI 600 may be used in conjunction with a user's client spreadsheet application. Cell sets 602A-C include the set of attributes for an implanter object, cell 604. Corresponding values are displayed in cell sets 606A-C. Note that the value of attribute ObjType, shown in cell set 602A, has the value "equipment," displayed in cell set 606A and attribute ObjID has the value "implanter" corresponding to equipment object 506, FIG. 5. Note that the set of attributes in cell sets 602A-C and values in cell sets 606A-C reflect the attributes in attribute set 510 and value set 512 FIG. 5.

Additionally, GUI 600 includes control button 608. Selection of control button 608, such as by a "mouse-click" or other similar operation by the user, may initiate a request message from the spreadsheet application for, for example, a selected attribute value, from the tool via the equipment object model, which message may be passed to the equipment model using a predetermined object-oriented interprocess communication protocol, COM, for example.

Figure 7:
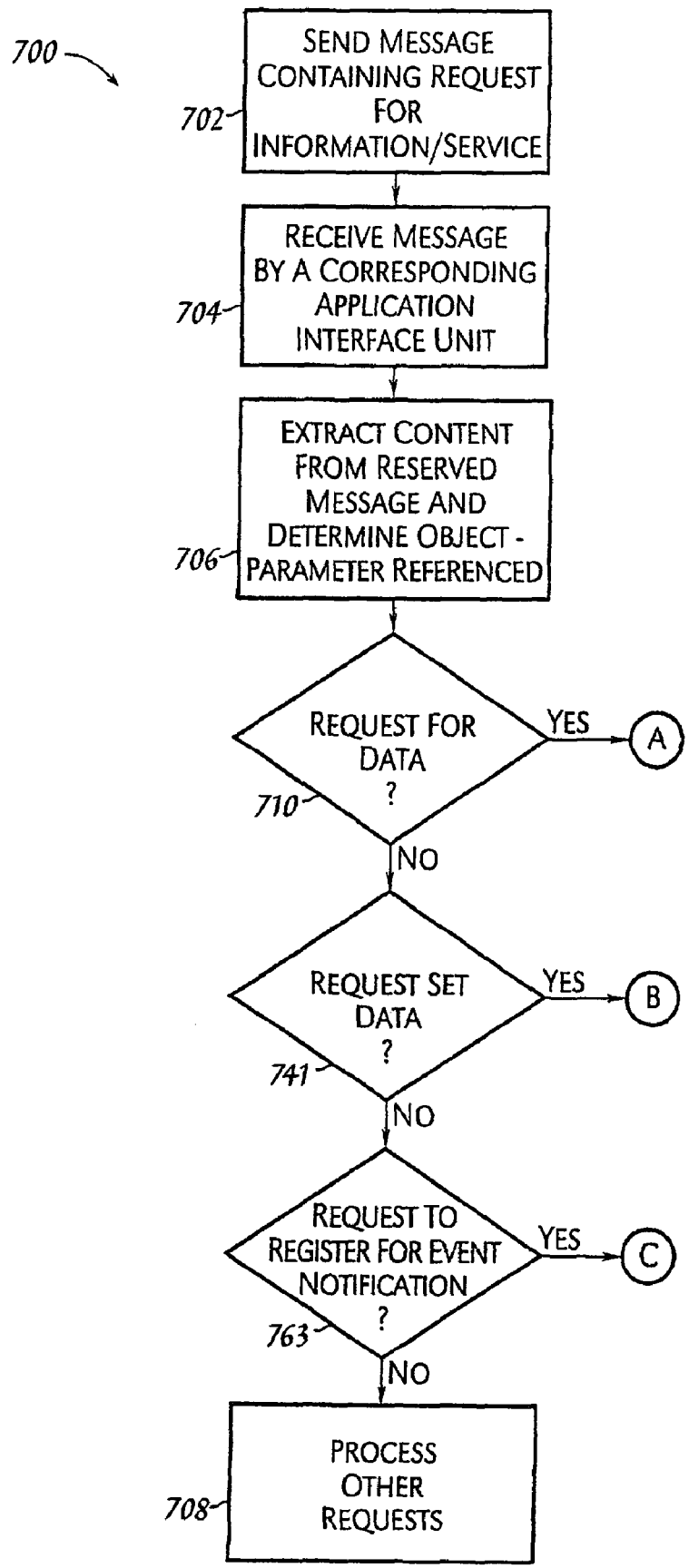
FIG. 7 is a flowchart of a method for retrieving information and/or issuing service requests from and/or to a tool via an equipment model.

Refer now to FIG. 7, illustrating in flowchart form, a method 700 for communicating messages between tools, such a tools 103, FIG. 1 via an equipment model.

Referring again to FIG. 3, application interface unit 301 may be configured to communicate messages between one of users 101 and tools 103. Each application interface unit 301 may be configured to receive messages from user 101 via a user application communicating in one or more object-oriented interapplication protocols, e.g., COM, RMI, CORBA, SOAP, HTTP or a legacy native message, such as a SECS message. Furthermore, each application interface unit 301 may be configured to receive messages from users 101 in a particular manner, e.g., WAN, LAN, factory system. For example, application interface unit 301A may be configured to receive messages from users 101A in a protocol such as COM, RMI, CORBA, SOAP and XML over a LAN. Application interface unit 301B may be configured to receive messages from users 101B via a legacy application, for example MES, in a protocol such as SECS over a factory system network, or other communication link. Application interface unit 301C may be configured to communicate messages from users 101C in a protocol such as HTTP request over a WAN or the Internet, and receive messages wrapped in a document such as an HTML or XML document. A detailed description of methods and apparatus which may be used in such an application interface unit may be found in the co-pending commonly-owned U.S. patent application Ser. No. 09/496,009 entitled "Apparatus and Method for Web-based Tool Management" which is hereby incorporated in its entirety herein.

FIG. 7 illustrates a flowchart of one embodiment of the present invention of a method 700 for retrieving information, e.g., temperature, pressure, and/or issuing service requests, e.g., control message, to one or more tools 103 via an equipment model 302, e.g., OBEM™. As discussed hereinabove, software in a tool server 102 may embody a software architecture constituting an equipment model, e.g., OBEM, that implements a logical representation of a tool or tools, such as tools 103, FIG. 1.

In step 702, a user 101, such as one of users 101-101C, may issue a message to a particular application interface unit 301, e.g., application interface unit 301A, requesting information, e.g., temperature, pressure, status, and/or issuing a service request, e.g., control message, from and/or to a particular tool 103. The message may be associated with the particular user 101 by a thread in a multitasking or multiprocessing environment.

In step 704, the message may be received by a corresponding one of application interface units 301. As stated above, users 101 may access particular application interface units 301 using an application which communicates messages in accordance with an object-oriented interapplication communication protocol, or (equivalently object-to-object protocol) e.g., COM, RMI, CORBA, SOAP, HTTP etc., in a variety of manners, e.g., WAN, LAN. For example, application interface unit 301A may be configured to receive messages from users 101A in a protocol such as COM, RMI, CORBA, SOAP and HTTP over a LAN. Application interface unit 301B may be configured to receive messages from users 101B in a native protocol such as SECS over a factory system network. Application interface unit 301C may be configured to receive messages from users 101C using protocol such as HTTP over a WAN or the Internet.

As previously described, to facilitate communications between a tool and a user across different data processing platforms using a multiplicity of applications messages between a tool and a user, mediated by the equipment model, messages may be exchanged via an object-oriented interprocess communication, or data exchange protocol. Examples include CORBA, RMI, COM and SOAP. Additionally, an application may use a native communication protocol such as SECS or the message in a HTTP request or XML/HTML page.

In step 706, application interface unit 301 that received the message in step 704 may extract the content of the received message, for example data required by the requested action. As stated above, the content of the received message may be a request for particular information, e.g., temperature, pressure, status, from one or more tools 103; or may request to set a particular parameter, e.g., a control set-point; or may request notification of, e.g., the change in value of a parameter. Included in the message is a pointer to the object in the equipment model representing the tool 103, or component thereof on which the action is to be performed, and the particular variable or parameter affected.

If the request is neither a request to get data or set data, nor a notification request, steps 710, 741 and 763, discussed further below, fall through their "No" branches and method 700 processes the request, for example, a service request such as starting or stopping the tool, in step 708, through the appropriate tool interface.

Otherwise, if the request is one of a request to get data, set data or a notification request, the operations performed may depend on the characteristics of the tool 103, or component thereof.

A tool 103 may be characterized as a synchronous source, a mutable synchronous source, and/or an asynchronous source of the data requested in step 706 as described below. A synchronous source may refer to a tool that supplies a value to the user's 101 request for particular information, e.g., temperature, pressure, status. A mutable synchronous source may refer to a tool 103 setting that may be set by user 101. Setting may refer to user 101 setting a particular variable or parameter associated with a particular tool 103 to a particular value. An asynchronous source may refer to a particular tool 103 that informs user 101 when an event occurs, e.g., value changes. Tool interface units 303 may be configured to continuously monitor its associated tools 103 for when an event occurs. When the event occurs, the tool interface unit 303 may notify equipment model 302 that the event occurred. Equipment model 302 may then be configured to invoke a method to notify user(s) 101 of interest based on pointer(s) to those user(s) 101.

In step 712, a determination may be made by the method as to whether the parameter of the object determined in step 708 has an asynchronous source where the value supplied by the asynchronous source is current. If the parameter of the object has an asynchronous source where the value supplied by the asynchronous source is current, then that current value is retrieved from the local object, step 713 and transferred to the appropriate application interface in step 728. In step 730, the appropriate application interface unit 301 may then be configured to incorporate the received data value into a return message to user 101 in accordance with the appropriate protocol. In step 732, the message may be transferred to the appropriate user 101 based on an address previously provided by the user's client application.

Referring to step 710, if the particular tool 103 does not supply an asynchronous source with currently valid data, then a determination may be made as to whether the particular tool 103 supplies synchronous source in step 734. If the particular tool 103 supplies a synchronous source, then the appropriate tool interface unit 303 may retrieve the data value from the particular tool 103 in step 736. The appropriate tool interface unit 303 may be enabled to retrieve the data value by a method of equipment model 302 in accordance with a native communication protocol of equipment model 302, e.g., SECS. The appropriate tool interface unit 303 may then transfer the data value to equipment model 302 in step 728. The value may be communicated to the user in step 728 as discussed hereinabove.

If the particular tool 103 is not a synchronuous source, then a determination may be made as to whether the particular tool 103 supplies an asynchronuous source but for which there is currently no valid data, step 737. If so, the request fails step 739, and a failing response is returned to the user in steps 728-739, as previously described.

Otherwise, step 737 proceeds by the "No" brand to step 740 to retrieve the data value from the local object. The value may be communicated to the user in step 728-732 as discussed hereinabove.

Returning to step 710, if the request not a request for data, then in step 741 is a determination is made whether the request is a request to modify a data element. If so, the operations performed again depend on the characteristics of the tool 103. In step 751, a determination is made whether the tool supplies a mutable synchronuous support for the parameter affected, as previously discussed. If so, step 753 sets the parameter through the appropriate tool interface. Upon completing this operation, step 755 notifies all users who have requested notification when the affected parameter is set, as will be further described subsequently in conjunction with step 765. The request is then returned to the user in steps 728-732 as described previously.

Returning to step 751, if the determination is made that the tool does not supply a mutable synchronuous source for the property in question, a determination is made in step 757 whether the tool supplies synchronuous or asynchronuous support for that property. If so, step 759, request fails, and this status is returned to the user in steps 728-732 as described previously.

Returning to step 757, if the determination is made that the tool does not supply synchronuous or asynchronuous support for the property in question, then step 761 sets the property in the local object to the requested value, step 755, notify users of the property change, and subsequent steps, are then executed, as described previously.

Returning to step 741, if the determination is made that the request is not a request to get a data value, then a determination is made, step 763, whether the request is a request to be notified when an event such as a property changing, occurs. If so, then step 765 stores a reference to the user making the request, together with the object and parameter pertaining thereto. An acknowledgment of the request is then returned to the user in the previously discussed steps 728-732.

Figure 8:
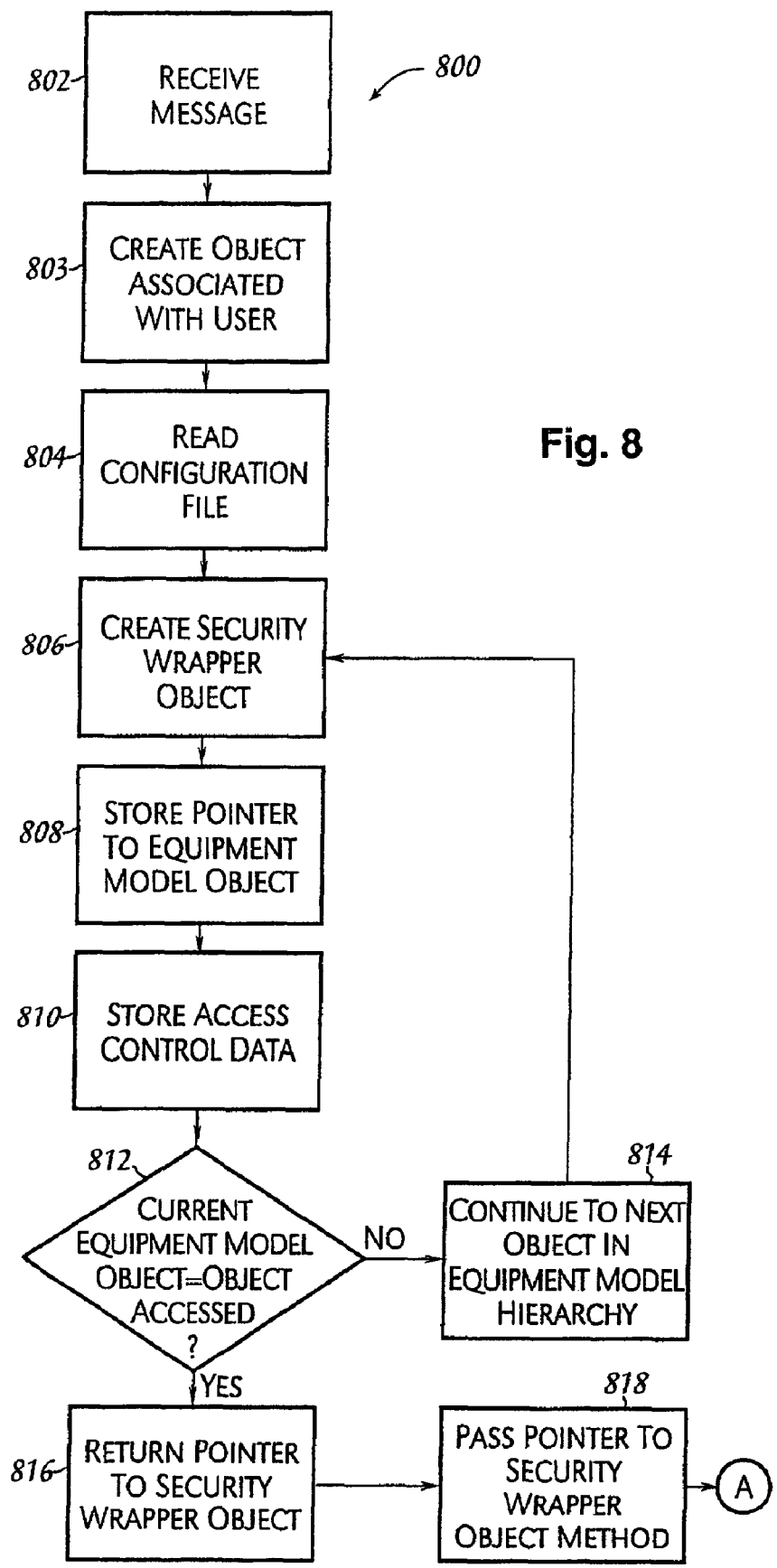
FIG. 8 is a flowchart of a method for tool access control.

FIG. 8 illustrates a flowchart of a method 800 for tool access control in accordance with an embodiment of the present invention. That is, method 800 may be used to control actions a user, or class of users may take with respect to a particular tool.

In step 802 a request message is received from a user, for example one of users 101A-C, FIG. 1. The message may request data with respect to the tool or a component of the tool, or request a service from the tool, which message thus accesses the tool or component, as previously described.

In step 803, the method 800 may create an object associated with the particular user 101, e.g., user 101A. as illustrated by user object 950, FIG. 9. Object 950 may contain an identifier of the associated user, for example user 101A.

FIG. 9 illustrates a security wrapper architecture 900 in accordance with the principles of the present invention. Software architecture 900 may further comprise one or more security wrapper objects 911-915A in a wrapper layer 901 that are associated with root object 912A, equipment object 912B, module object 912C, subsystem object 912D and I/O object 912E, respectively, which logically represent tool elements as previously described. Security wrapper objects 911A-E may collectively or individually be referred to as security wrapper object 911 or security wrapper object 911, respectively. A detailed discussion of security wrappers 911 is provided further below. It is noted that software architecture 900 may include any number of security wrappers 911 and that multiple security wrappers 911 may be associated with multiple objects on a particular hierarchy of equipment model 302. For example, software architecture 900 may include a plurality of security wrappers 911 associated with a plurality of equipment objects 912B. FIG. 8 will be further described in conjunction with FIG. 9.

Returning to FIG. 8, in step 804, a configuration file, which may include access control information is accessed. In particular, the configuration file may include access control information with respect to a group of users including the user corresponding to user object 950, FIG. 9, or alternatively to the user individually. Additionally, a tool itself, or a component thereof may be viewed as a user, and user object 950 may correspond to such a tool or component. Wrapper layer 901, FIG. 9 may be generated in response to access information corresponding to the user associated with user object 950.

A security wrapper layer, such as wrapper layer 901, FIG. 9 may be generated by method 800 in steps 806-816. In steps 806-816, security wrapper layer 901 may be recursively generated. The security wrapper objects created, which parallel corresponding ones of equipment model objects, depend on the depth in the equipment model hierarchy of the equipment object being accessed. In other words, security wrappers are created as needed in accordance with the request message from the user. In step 806, a wrapper object, for example, one of security wrapper objects 911A-E is created. In step 808, a pointer to the corresponding equipment model object, for example, one of objects 912A-912E, is stored in the security wrapper object created in step 806. Additionally, in step 810, corresponding to the particular user, and the tool, or tool component being accessed by the tool object model, are stored in the security wrapper object. In step 812, it is determined if the current equipment model object corresponds to the object for which the excess request is being made. If not, in step 814, process 800 proceeds to the child of the current equipment model object, and returns to step 806 to create the security wrapper object for the child. In other words, step 806-814 drill down through the equipment model hierarchy until, in step 816 the object for which the access request is being made is reached. In step 816, a repointer to the corresponding wrapper object is then returned to the user, that is, the user's client application from which the access request originated. In step 818, it is determined based on the access rules stored in the object, step 810, if the user can access the data or request this service corresponding to the message received. If so, in step 820, the security wrapper object invokes the method in the corresponding equipment model object to perform the action requested. Otherwise, access is denied, step 822.

Returning to step 805, if the security wrapper for the equipment model object being accessed exists, in step 807 a pointer to the wrapper object is returned, and in step 818, the pointer to the security wrapper object is the passed to the method to perform the particular action with respect to the equipment object requested. In step 820, it is determined if access is permitted in accordance with the access control information stored in this corresponding security wrapper object. If access is permitted for the particular action, the corresponding method of the equipment model object is invoked, step 822 otherwise, access is denied, step 824.

In this way, the security wrapper objects, such as security wrapper objects 911A-911E in FIG. 9, operate as "filters" to control access to a tool, component thereof. Note that additional security wrapper layers, such as layer 901, FIG. 9, may be built in accordance with control information in the configuration list to provide additional "filtering". It would be recognized by those of ordinary skill in the art, that a second security wrapper layer built in this way would be include security wrapper objects analogous to objects 911A-911E, FIG. 9, in which pointers to the corresponding security wrapper objects in the first layer would be stored. In this way, an access request to a particular equipment model object would be serially filtered in that the access request would pass the pointer to the security wrapper object in the second layer to the method, as described in conjunction with step 820, which method would then pass the pointer contained in the corresponding security wrapper object in the first security wrapper layer, after making an access grant determination as discussed in conjunction with step 820, wherein, then, corresponding security wrapper object in the first layer pointed to by the pointer pass in the method invocation would make a security grant determination based on the access control information contained therein, and, on grant of access, pass its pointer to the invocation of the tool of the equipment object method.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for automated tool management comprising the steps of:
    receiving a message by an application interface unit in a first protocol from a user, wherein said message comprises a request to perform a selected action on a tool, data, and a pointer to an object in an equipment model of said tool;
    invoking a method of said object associated with said pointer and said selected action;
    supplying a value received from said tool in response to the invoking when the tool is a synchronous source;
    setting a value in said tool in response to the invoking when the tool is a mutable synchronous source;
    checking a local database for information in response to the invoking when the tool is an asynchronous source; and
    returning a result to said user corresponding to the supplying, setting, or checking.

2. The method as recited in claim 1 further comprising the step of:
    extracting one or more of said data and said pointer of said received message.

3. The method as recited in claim 1, wherein if said tool is an asynchronous source and if said value associated with said requested action is current, then the method further comprises the steps of:
    transferring said value to the application interface unit by said equipment model, wherein said application interface unit interfaces said user with said equipment model;
    incorporating said value into a return message to said user; and
    transferring said return message via object-oriented interprocess communication to said user.

4. The method as recited in claim 1, wherein if said tool is a synchronous source, then the method further comprises the steps of:
    retrieving said value from said tool by the tool interface unit, wherein said tool interface unit interfaces said tool with said equipment model; and
    transferring said value to said local database.

5. The method as recited in claim 4 further comprising the steps of:
    incorporating said value into a return message to said user; and
    transferring said return message to said user.

6. The method as recited in claim 1, wherein said local database includes
    said equipment model.

7. The method as recited in claim 6 further comprising the steps of:
    incorporating said value into a return message to said user; and
    transferring said return message to said user in response to an address provided by said user.

8. The method as recited in claim 1, wherein the message is received via object-oriented interprocess communication, wherein said interprocess communication comprises a protocol selected from a group consisting of Component Object Model (COM), Remote Method Invocation (RMI), CORBA, Simple Object Access Protocol (SOAP), SECS, GEM, HyperText Markup Language (HTML), or Extensible Markup Language (XML).

9. The method as recited in claim 1, wherein said method of said object is invoked to remotely access and electronically diagnose said tool.

10. The method as recited in claim 1, wherein said data in said message is notification data.

11. The method as recited in claim 1 wherein the message is received via object-oriented interprocess communication.

* * * * *